US007987335B1

(12) United States Patent
Dickinson et al.

(10) Patent No.: US 7,987,335 B1
(45) Date of Patent: Jul. 26, 2011

(54) TECHNIQUES FOR VIRTUALIZING DATA

(75) Inventors: Derek D. Dickinson, Sanford, FL (US); Suren Sethumadhavan, Lake Mary, FL (US); Kirk Searls, Maitland, FL (US); Christopher Greene, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 736 days.

(21) Appl. No.: 12/058,181

(22) Filed: Mar. 28, 2008

(51) Int. Cl.
*G06F 12/00* (2006.01)
(52) U.S. Cl. .................. 711/170; 711/203; 711/E12.001
(58) Field of Classification Search .................. 711/170, 711/112, 155, E12.001, 203; 707/204
See application file for complete search history.

(56) References Cited

U.S. PATENT DOCUMENTS 7,334,095 B1 * 2/2008 Fair et al. ...................... 711/161
2004/0139128 A1 * 7/2004 Becker et al. ................. 707/204
* cited by examiner

*Primary Examiner* — Pierre-Michel Bataille
(74) *Attorney, Agent, or Firm* — Hunton & Williams LLP

(57) ABSTRACT

Techniques for virtualizing data are disclosed. In one particular exemplary embodiment, the techniques may be realized as a method for virtualizing data comprising identifying source data to be virtualized, intercepting an input/output (i/o) request to the source data, determining whether the input/output request is a read request or a write request, in the event the input/output request is a write request, storing one or more changes contained in the write request, and in the event the input/output request is a read request, determining whether a portion of data requested has been modified and responding to the read request. Responding to the read request may comprise providing stored data in the event a portion of the data requested has been modified, and utilizing source data in the event the data requested is unmodified.

20 Claims, 3 Drawing Sheets

TECHNIQUES FOR VIRTUALIZING DATA

FIELD OF THE DISCLOSURE

The present disclosure relates generally to data virtualization and, more particularly, to techniques for virtualizing data.

BACKGROUND OF THE DISCLOSURE

Many processes require the ability to write to data locations which should not or perhaps can not be written to. Recovery processes, operating system processes and other processes may wish to write changes to such data locations. Administrators may want to ensure that data remains unmodified to preserve its original state for many reasons. The data may be backup data which must remain unmodified to ensure that a viable backup copy exists. The data may be an image file of an operating system, a platform or other system which an administrator or owner of the data may want to maintain as a master or a base image. The data may also be write protected or read only data. For example, it may be a snapshot volume and the volume may not be writable. In order to enable a recovery process, an operating system process, or other processes to write to such data locations, administrators may copy the data to a new volume, partition, or other storage area that is writable. Backup data, platform images and other non-modifiable data may be quite large. Moving such data may require significant additional storage space. Moving such data may also require significant time and may delay restoration or other processes that depend on access to the data. Additionally, data, such as backup data, may be replaced with new backups, and therefore maintaining a writable version of such data may require multiple copy operations and potentially multiple stored copies.

In view of the foregoing, it may be understood that there are significant problems and shortcomings associated with current techniques for accessing backups or other data which is not modifiable.

SUMMARY OF THE DISCLOSURE

Techniques for virtualizing data are disclosed. In one particular exemplary embodiment, the techniques may be realized as a method for virtualizing data comprising identifying source data to be virtualized, intercepting an input/output (i/o) request to the source data, determining whether the input/output request is a read request or a write request, in the event the input/output request is a write request, storing one or more changes contained in the write request, and in the event the input/output request is a read request, determining whether a portion of data requested has been modified and responding to the read request. Responding to the read request may comprise providing stored data in the event a portion of the data requested has been modified, and utilizing source data in the event the data requested is unmodified.

In accordance with other aspects of this particular exemplary embodiment, the techniques may be realized as an article of manufacture for virtualizing data. The article of manufacture may comprise at least one processor readable carrier, and instructions carried on the at least one carrier, wherein the instructions may be configured to be readable from the at least one carrier by at least one processor and thereby cause the at least one processor to operate so as to identify a location for virtualized data, provide a reference from the location to source data, intercept an input/output request to the reference, and determine whether the input/output request is a read request or a write request. In the event the input/output request is a write request, the processor may store write data identified in the write request, and in the event the input/output request is a read request, the processor may provide read data. The read data may include at least a portion of the write data in the event at least a portion of data identified in the read request is write data identified in a prior write request. The read data may include data from the source data in the event the data identified in the read request is not write data identified in a prior write request.

In accordance with further aspects of this particular exemplary embodiment, the techniques may be realized as a system for virtualizing data comprising one or more processors communicatively coupled to a server, wherein the server may be configured to intercept an input/output request identifying source data and determine whether the input/output request is a read request or a write request. In the event the input/output request is a write request, the server may store write data identified in the write request, and in the event the input/output request is a read request, the server may provide read data. The read data may include at least a portion of the write data in the event at least a portion of data identified in the read request is write data identified in a prior write request. The read data may include data from the source data in the event the data identified in the read request is not write data identified in a prior write request.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
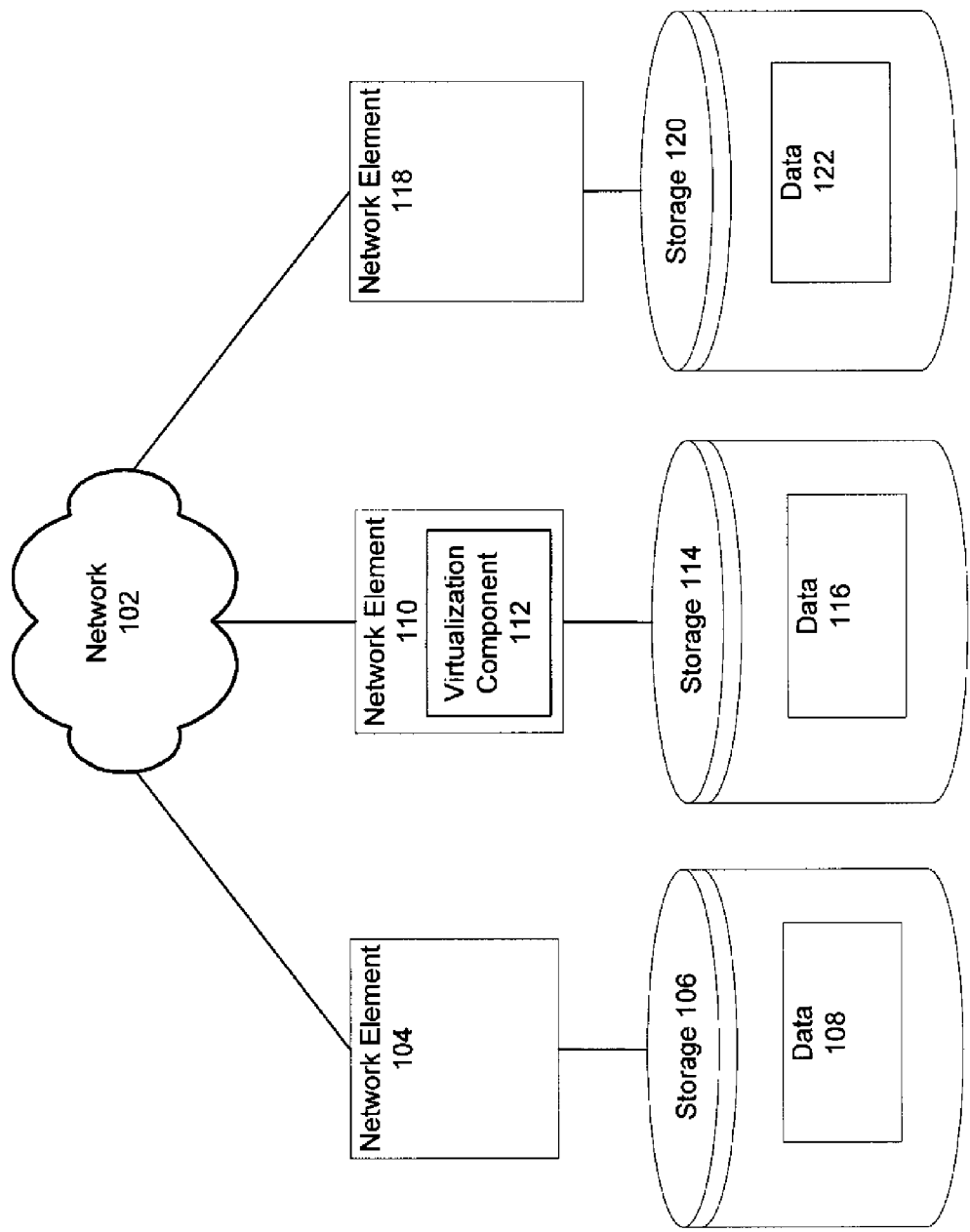
FIG. 1 shows a system for virtualizing data in accordance with an embodiment of the present disclosure.

Referring to FIG. 1, there is shown a system 100 for virtualizing data in accordance with an embodiment of the present disclosure. FIG. 1 is a simplified view of system 100, which may include additional elements that are not depicted. Network elements 104, 110 and 118 may be communicatively coupled to network 102. Network elements 104, 110, and 118 may also be communicatively coupled to one or more storage systems such as storage 106, 114, and 120. Storage 106, 114, and 120 may contain one or more portions of data including data 108, data 116 and data 122. Network element 110 or other network elements may contain a virtualization component, such as virtualization component 112.

Network elements 104, 110 and 118 may be application servers, backup servers, network storage devices or other devices communicatively coupled to network 102. Network elements 104, 110 and 118 may utilize storage 106, 114, and 120 for the storage of application data, backup data or other data.

Storage 106, 114, and 120 may be local, remote, or a combination thereof to network elements 104, 110 and 118. Storage 106, 114, and 120 may utilize a redundant array of inexpensive disks (RAID), a redundant array of inexpensive nodes (RAIN), tape, disk, a storage area network (SAN), or other computer accessible storage. Storage 106, 114, and 120 may contain data 108, 116 and 122, respectively.

Data 108, 116 and 122 may include data written by one or more applications hosted by network elements 104, 110, and 118. Data 108, 116 and 122 may contain one or more user created data files such as, for example, a document, a list, an image file, an email, a posting, a web page, xml data, a sound file, and a video file. Data 108, 116 and 122 may be stored in one or more formats or data structures. Data structures may be determined by an underlying platform or system supporting an application. Data 108, 116 and 122 may be stored in a read only or a write protected format, such as snapshot data. For example, data may be Microsoft® Exchange data provided by a volume snapshot service. Data may be virtualized at a file level, a directory level, a volume level, or in other file system increments. Data virtualization may enable read and/or write access to source data without modification of the source data by intercepting and handling input/out requests identifying the source data or a reference or other indicator of the source data.

Network 102 may be a local area network (LAN), a wide area network (WAN), the Internet, a cellular network, a satellite network, or other networks that permit communication between network elements 104, 110, and 118 and other devices operatively connected to network 102.

Network elements 104, 110, and 118 may contain one or more components enabling the virtualization of data, such as virtualization component 112. In one or more embodiments, virtualization component 112 may enable virtualization of data by intercepting one or more input/output (I/O) requests. For example, a user may specify that data 122 is to be virtualized. Data 122 may be backup data which may be stored on a snapshot volume of storage 120. Virtualization component 112 may access data 122 via network 102. Virtualization component 112 may utilize a network file system (NFS) share, a network share utilizing SAMBA, a network share utilizing the server message block (SMB) protocol or via other network connectivity methods. Virtualization component 112 may establish one or more sessions connecting to one or more networked resources. Virtualization component 112 may enable a user to specify a location for virtualized data to appear. Virtualization component 112 may also use a default location, a current location or other algorithms to determine the location of virtualized data. Continuing with the prior example, if data 122 is to be virtualized, virtualization component 112 may specify a location on storage 106, such as data 108 where the virtualized data may appear. Data 108 may be virtualized data. Input/output (I/O) requests identifying data 108 may be intercepted and handled by virtualization component 112.

Handling input/out (I/O) requests may involve making one or more read and/or write requests appear as if they were occurring normally to a requestor. Write requests may be redirected by virtualization component 112 and write data may be stored without modifying data 122. Write data identification in write requests may be stored in memory, such as memory associated with a session created by virtualization component 112. Write data identification in write requests may also be written to a file, such as a delta file or in other data structures on a storage medium. In one or more embodiments, a user of virtualization component 112 may specify whether write data identified in write requests are stored in memory and/or written to a delta or log file. In some embodiments, write data may be stored in memory and may be written to a file when a memory limitation or other conditions are reached. Write data written to a file may be data received in memory first, data received in memory last, data requested less frequently by read requests or may be determined by other factors. Data written to a file may be used as a cache file for servicing read requests.

Read requests targeted for virtualized data 108 may be analyzed to determine whether one or more portions of data requested have been modified. If one or more portions of data requested have been modified via a prior write request, virtualization component 112 may access stored write data to ensure that data returned to the requestor reflects the most current data. If data requested has not been modified, virtualization component 112 may service the read request from data 122.

In one or more embodiments, virtualization component 112 may utilize a file system filter driver to facilitate the interception of (I/O) requests. Virtualization component 112 may enable a plurality of processes or applications to access virtualized data. Multiple processes or applications may be able to utilize a session created by virtualization component 112 to access virtualized data. In one or more embodiments, virtualization component 112, may not specify a separate location for virtualized data, but may enable one or more virtualized writes and/or reads of data without modifying the data by intercepting and handling input/output (I/O) requests.

Virtualization component 112 may enable subsequent sessions to view data which has been virtualized. For example, data 122 may represent a snapshot volume containing backup data. Data 108 may represent virtualized data that may appear during a session created by virtualization component 112 for access to data 122. Data 108 may not require additional storage, synchronization, or copying and may contain one or more portions of data 122. Data 108 may be a path, a link, a pointer, a reference or other mechanism which may make one or more portions of data 122 accessible via storage 106. At the end of a session created by virtualization component 112, data 108 may no longer exist or be accessible to users. Data stored in memory during the session, which may reflect write requests to data 122, may be lost. Data stored in a file may be accessible during subsequent sessions. A user may specify at the beginning or end of a session whether data should be written to a file.

Virtualization component 112 may specify a delta file to use during a subsequent session to determine prior changes to data when virtualizing previously virtualized data. The delta file may be specified by a user requesting virtualization, by an application requesting the virtualization or virtualization component 112. Virtualization component 112 may maintain metadata about one or more delta files to determine when a delta file should be used. For example, virtualization component 112 may use a delta file to include prior changes in data if the volume for the data is the same as a prior session and/or if a requester is the same as the prior session.

Virtualization of data may enable processes to run utilizing read only or write protected data. For example, virtualization may enable recovery processes to utilize backup data stored in a read only format, such as a snapshot. Recovery processes may run on a separate file space without requiring copying of the read only data to the file space. Virtualization may enable the recovery process to read and write transparently to the virtualized data, such as writing uncommitted transactions to log files, without affecting the original backup data. This may enable saving space traditionally required for recovery staging and/or saving time traditionally required for copying of data. The ability to store changes to data in a file may allow recovery to occur once without modifying backup data and may enable subsequent sessions to virtualize recovered data in order to retrieve additional data without running a second recovery process or requiring additional storage or data copying.

Virtualization of data may enable other processes or users to benefit as well. For example, operating systems, applications, platforms or other processes may utilize a virtualized copy of a master copy of an operating system to run. For example, a virtualized copy of an operating system may be run in a test environment and updates or patches may be applied to the virtualized copy for testing purposes without affecting the master copy. This may enable testing an ability to roll back or reapply changes to data without requiring changes to the master copy.

Figure 2:
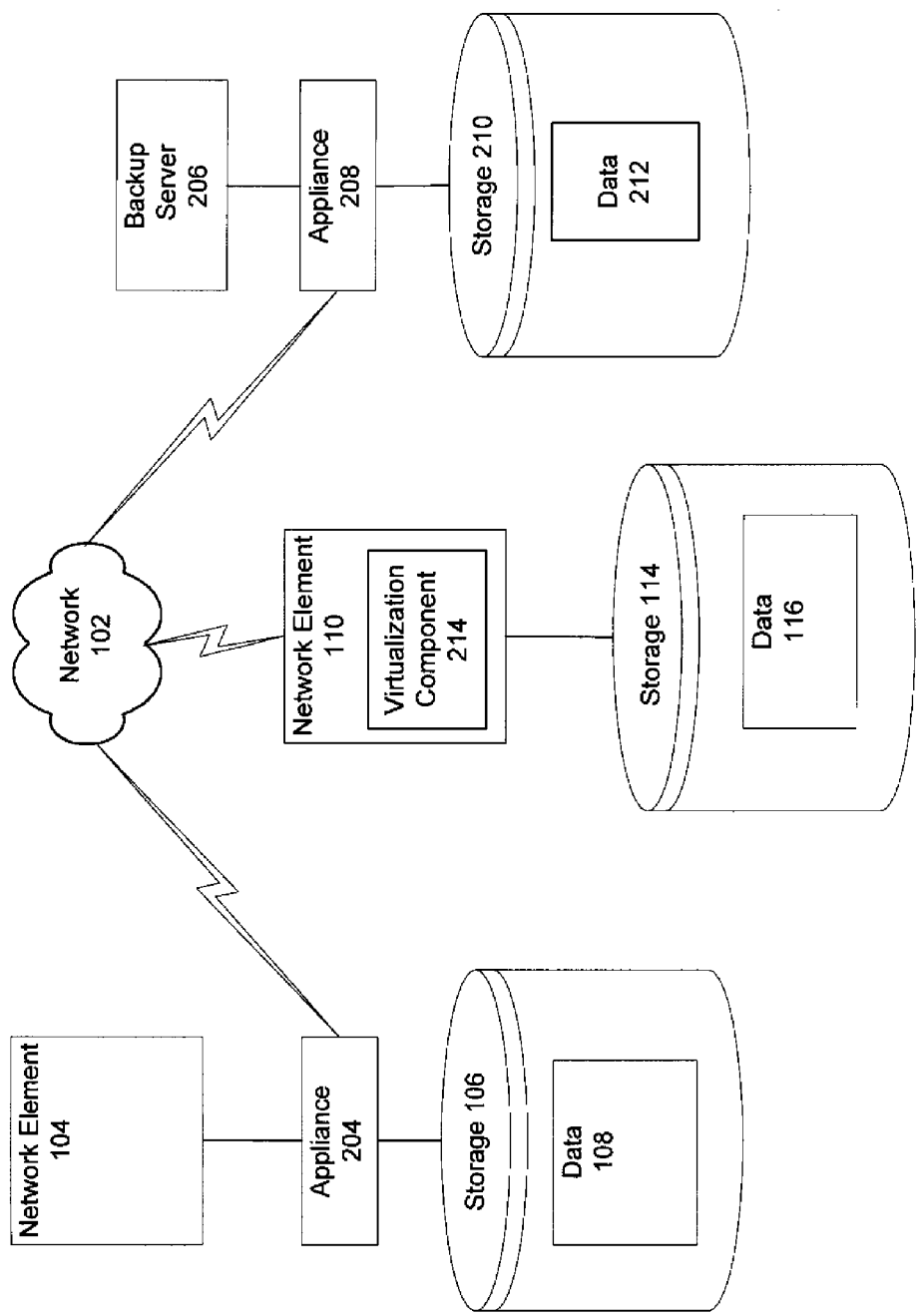
FIG. 2 shows a system for virtualizing data in accordance with an embodiment of the present disclosure.

Referring to FIG. 2, there is shown a system 200 for virtualizing data in accordance with an embodiment of the present disclosure. FIG. 2 is a simplified view of system 200, which may include additional elements that are not depicted. As illustrated, FIG. 2 may contain many of the same elements as discussed in reference to FIG. 1, including, network elements 104 and 110, storage 106 and 114, data 108 and 116, and network 102. FIG. 2 may additionally include appliances 204 and 208, backup server 206, storage 210, data 212, and virtualization component 214.

Appliances 204 and 208 may be a continuous data protection and replication (CDP/R) device which may provide continuous data protection and replication (CDP/R) services to network element 104 and backup server 206. CDP/R services may be provided through the use of a network switch or may be provided through a continuous data protection and replication appliance. In one or more embodiments, appliances 204 and 208 may represent a network switch providing CDP/R services to network element 104 and backup server 206. Appliances 204 and 208 may by operatively connected to storage 106 and storage 210.

In one or more embodiments, storage 106 and storage 210 may represent a storage area network (SAN), an Internet small computer systems interface (iSCSI) SAN, a Fiber Channel SAN, a common Internet File System (CIFS) or a network file system (NFS).

Backup server 206 may process one or more backup requests and may provide backup services to one or more hosts, such as, for example, network element 104. Backup server 206 may utilize storage 210. Backup server 206 may utilize other storage such as storage 114 for backup data storage. Storage 210 may contain logs, files, or other data structures containing backed up application data. Data 116 may contain recovery files which may be delta files containing write data identified in write requests that may be written to an application data store or a database during recovery.

Virtualization component 214 may utilize appliances 204 and 208 to replicate data 108. Appliance 208 may be utilized to create a virtual replica of data 108 on storage 210, which may be a SAN. Virtualization component 214 may utilize appliance 208 to create a virtual logical unit number (LUN) on storage 210. Appliance 208 may create one or more point in time (PIT) images of one or more virtual replicas of data. Data 212 may represent a point in time (PIT) image.

Data 212 may represent a point in time (PIT) image of data 108. Point in time (PIT) images may allow a process or device exclusive access to the content referenced by a point in time (PIT) image. Point in time images may appear to be separate files or images from a master file upon which they are based, but may in fact require no additional storage other than the storage required for the original master file. Point in time images may be writable and one or more changes made to a point in time image may be stored in storage associated with the point in time image. A point in time image may allow one or more processes to thus obtain exclusive access to the content of a master image using no additional storage beyond the storage previously allocated for the master image. Changes to the point in time image may be made by a device or process utilizing the point in time image. Such changes may be written to storage associated with the point in time image without affecting the master image upon which the point in time image is based. This may allow a device or process utilizing the point in time image to write changes to a point in time image to a virtual device or virtual environment. Appliance 208 may make point in time images accessible through the creation of virtual LUNS exposed on storage 210.

Figure 3:
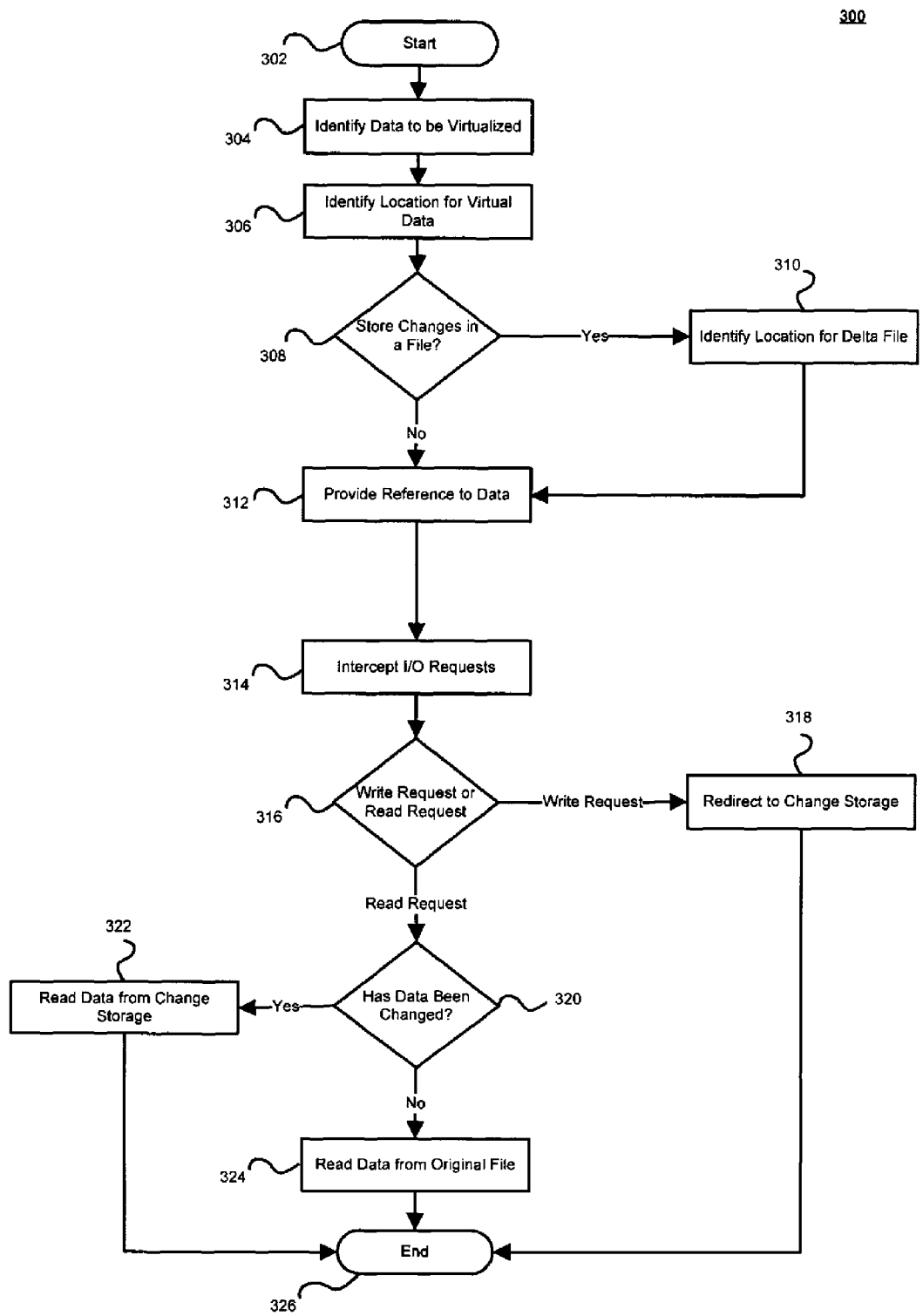
FIG. 3 shows a method for virtualizing data in accordance with an embodiment of the present disclosure.

Referring to FIG. 3, there is shown a method 300 for virtualizing data in accordance with an embodiment of the present disclosure. At block 302, the method 300 for virtualizing data may begin.

At block 304, the data to be virtualized may be identified. This may occur by a user utilizing a virtualization component and specifying data to be virtualized. This may occur when a process or application detects read only or write protected data to which it may need write access and the process or application requests virtualized data.

At block 306, a user or process may identify a location for virtualized data. A location may also be a default location for a virtualization component or a location determined by an algorithm of a virtualization component. For example, a virtualization component may determine a location based on resources associated with a storage location, performance of reads and writes to the location, an owner or process associated with the data, a data type or other factors. The location may be a location local to a virtualization component or a process requiring virtualized data. The location may also be a location which is network accessible to a process or user requiring virtualized data. In one or more embodiments, the location may be the same volume as source data which is being virtualized.

At block 308, the method 300 may determine whether any data written during virtualization should be stored in memory, stored in a delta file or both. If a delta file is requested, the method may continue at block 310. If a delta file is not requested, the method may continue at block 312.

At block 310, a location for a delta file may be identified. The location may be writable storage which is local to or network accessible to a virtualization component. In one or more embodiments, changes to virtualized data may be stored in memory as well as in a file.

At block 312, a path, reference, link or other mechanism may be provided for access to the virtualized data. The path may enable access to one or more users of virtualization component or of a session associated with a virtualization component to access the virtualized data from the specified location transparently. It may appear as a symbolic link or other indicator of the virtualized data in the location specified for the virtualized data.

At block 314, one or more input/output (I/O) requests directed to the path may be intercepted. They may be intercepted and handled by a virtualization component. In one or more embodiments, a virtualization component may utilize a file system filter driver to intercept one or more I/O requests.

At block 316, the method 300 may determine whether an I/O request is a read request or a write request. If the input/output (I/O) request is a write request, the method 300 may continue at block 318. If the input/output (I/O) request is a read request, the method 300 may continue at block 320.

At block 318, a write request may be handled by redirecting the write to change storage. Change storage may be memory, a file written to disk, another data structure written to a storage medium, or a combination. In some embodiments, metadata facilitating the use and/or reuse of change storage may be written.

At block 320, the method 300 may determine whether a read request is seeking data which has been changed. If one or more portions of the data have been changed, the method may continue at block 322. If the data requested has not been changed, the method 300 may continue at block 324.

At block 322, a read request may be handled by returning data requested which may include changed data stored in change storage and unchanged data from the original data file or source of the virtualized data.

At block 324, a read request may be handled by returning requested data from the original file or source of the requested data.

At block 326, the method 300 may end.

At this point it should be noted that virtualization of data in accordance with the present disclosure as described above typically involves the processing of input data and the generation of output data to some extent. This input data processing and output data generation may be implemented in hardware or software. For example, specific electronic components may be employed in a virtualization component or similar or related circuitry for implementing the functions associated with data virtualization in accordance with the present disclosure as described above. Alternatively, one or more processors operating in accordance with stored instructions may implement the functions associated with data virtualization in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for virtualizing data comprising:
   intercepting, using at least one computer processor, an input/output request identifying read only data at a first location;
   determining whether the input/output request is a read request or a write request;
   in the event the input/output request is a write request, storing, at a second location, write data identified in the write request, wherein data stored at the second location represents modifications to the read only data at the first location; and
   in the event the input/output request is a read request, providing requested data;
      wherein the requested data includes at least a portion of the write data in the event at least a portion of data requested by the read request corresponds to modified data; and
      wherein the requested data includes data from the read only data in the event data requested by the read request corresponds to unmodified data.

2. The method of claim 1, wherein at least a portion of the write data is stored in memory.

3. The method of claim 1, wherein at least a portion of the write data is stored in at least one of: a file, a directory, a volume, a partition, one or more blocks, a storage area network, and a file system.

4. The method of claim 1, further comprising:
   identifying a location for virtualized data and providing a reference to read only data; and
      wherein the intercepted input/output request identifying read only data is an input/output request directed to the reference.

5. The method of claim 1, wherein a session is created for use during virtualization of the read only data.

6. The method of claim 5, wherein the session enables a plurality of applications to access the virtualized data.

7. The method of claim 5, wherein a delta file enables the session to access one or more changes stored in write data from a prior session.

8. The method of claim 1, wherein a file system filter driver is utilized to intercept input/output (i/o) requests.

9. The method of claim 1, wherein the read only data is backup data.

10. The method of claim 1, further comprising:
    enabling a user to specify whether one or more changes to virtualized data are stored in memory or written to a file.

11. At least one non-transitory processor readable storage medium for storing a computer program of instructions configured to be readable by at least one processor for instructing the at least one processor to execute a computer process for performing the method as recited in claim 1.

12. A system for virtualizing data comprising:
    one or more processors communicatively coupled to a server; wherein the server is configured to:
    intercept an input/output request identifying read only data at a first location;
    determine whether the input/output request is a read request or a write request;
    in the event the input/output request is a write request, store, at a second location, write data identified in the write request, wherein data stored at the second location represents modifications to the read only data at the first location; and
    in the event the input/output request is a read request, provide requested data;
       wherein the requested data includes at least a portion of the write data in the event at least a portion of data requested by the read request corresponds to modified data, and wherein the requested data includes data from the read only data in the event the data requested by the read request corresponds to unmodified data.

13. The system of claim 12, wherein at least a portion of the write data is stored in memory.

14. The system of claim 12, wherein at least a portion of the write data is stored in a delta file.

15. The system of claim 14, wherein the delta file enables subsequent sessions to access one or more changes stored in write data from a prior session.

16. The system of claim 12, wherein the server is further configured to:
   identify a location for virtualized data and provide a reference to read only data; and
      wherein the intercepted input/output request identifying read only data is an input/output request directed to the reference.

17. The method of claim 16, wherein the reference comprises at least one of: a network file share, a network share using SAMBA, a network share using the Server Message Block protocol, and a symbolic link.

18. The system of claim 12, wherein a session is created for use during virtualization of the read only data.

19. The system of claim 18, wherein the session enables a plurality of applications to access the virtualized data.

20. An article of manufacture for virtualizing data, the article of manufacture comprising:
   at least one processor readable storage medium; and
   instructions carried on the at least one storage medium;
   wherein the instructions are configured to be readable from the at least one storage medium by at least one processor and thereby cause the at least one processor to operate so as to:
      identify a first location for virtualized data;
      provide a reference from the first location to read only data at a second location;
      intercept an input/output request to the reference;
      determine whether the input/output request is a read request or a write request;
      in the event the input/output request is a write request, store, at a third location, write data identified in the write request, wherein data stored at the third location represents modifications to the read only data at the second location; and
      in the event the input/output request is a read request, provide requested data;
         wherein the requested data includes at least a portion of the write data in the event at least a portion of data requested by the read request corresponds to modified data; and
         wherein the requested data includes data from the read only data in the event the data requested by the read request corresponds to unmodified data.

* * * * *